(No Model.)

H. GREENE.
BELT FASTENER.

No. 328,212. Patented Oct. 13, 1885.

Witnesses
Chas. H. Smith
J. Stail

Inventor
Henry Greene
per Lemuel W. Serrell
atty.

N. PETERS, Photo-Lithographer, Washington, D. C.

UNITED STATES PATENT OFFICE.

HENRY GREENE, OF UPPER THAMES STREET, LONDON, ENGLAND.

BELT-FASTENER.

SPECIFICATION forming part of Letters Patent No. 328,212, dated October 13, 1885.

Application filed July 17, 1885. Serial No. 171,838. (No model.) Patented in England July 26, 1883, No. 3,662; in France May 10, 1884, No. 162,036, and in Belgium May 10, 1884, No. 65,125.

*To all whom it may concern:*

Be it known that I, HENRY GREENE, a subject of the Queen of Great Britain, residing at Upper Thames Street, in the city of London, England, have invented certain new and useful Improvements in Belt or Strap Fasteners, of which the following is a specification.

According to this invention I unite driving-straps and other straps or belts without overlapping, by means of fasteners which, while capable of uniting firmly with the strap-ends, also possess sufficient flexibility and strength.

Figure 4:
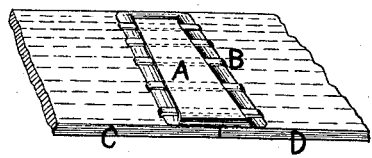
Figure 1:
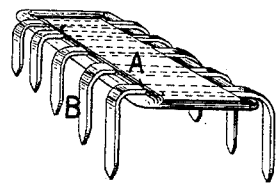
Figure 5:
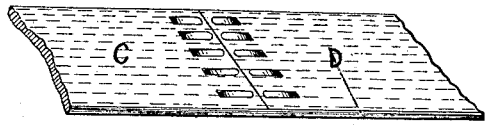
Figure 3:
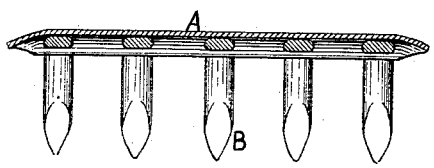
Figure 2:
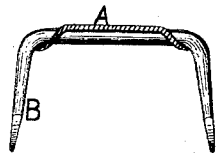

Figure 1 of the accompanying drawings is a perspective view of the fastener in the form it is made and ready to be applied. Fig. 2 is a transverse section, and Fig. 3 a longitudinal section, of the fastener. Fig. 4 is a perspective bird's-eye view of the fastener as applied to the union of two strap-ends. Fig. 5 is a perspective under side view of the fastener as applied to the union of two strap-ends.

A is the body of the fastener, made of steel or other sufficiently strong and tough metal. It is formed as a plate with bent-down edges and with holes near each side edge, as shown in Figs. 1, 2, 3, and 4, to admit of the teeth B being inserted and held in place. The teeth B are made of steel or other strong and tough metal. After having been inserted in the body A they are bent into the form shown in Figs. 1 and 2. It will be seen that the middle part of the teeth form ribs to the body A, thus adding the needed strength thereto. The teeth are by preference of the section shown, or thereabout, in order that their slightly-convex under side may be partly pressed into the material of the strap without, however, cutting it, while the outer or upper side of the teeth is flat. The teeth are sufficiently tapered at both edges and on the inner side for admitting of being conveniently pressed through the ends C and D of the strap, after which the ends are clinched or bent over, as shown in the top view, Fig. 4, and under side view, Fig. 5. By the shape of the body A, I combine great strength and elasticity, lightness, and cheapness, and I at the same time obtain facility for using teeth of any required strength.

It will be observed that the teeth of my fastener, when inserted in the material of the strap and then clinched, have no tendency to tear the material of the strap, and that my fastener is thus particularly suitable for driving-straps of textile materials, while it is at the same time generally suitable as a strong and firm means for connecting strap-ends.

It is not new to make fasteners of ordinary thin sheet metal with teeth cut out along two opposite edges, which teeth, after insertion through the strap are clinched; but such fasteners are liable to break unless made of very stout sheet metal, which is expensive and does not afford the required slight elasticity.

I claim as my invention—

A belt-fastening composed of a plate, A, of sheet metal with bent-down edges and with holes near each side edge, and metallic teeth B, which are inserted through the holes and pass across the plate, forming strengthening-ribs thereto, and bent at about right angles to the plate A, so as to be able to be passed through the belt and clinched, substantially as specified.

HENRY GREENE.

Witnesses:
   HERBERT E. DALE,
   ARTHUR R. SKERTEN,
   *Both of 17 Gracechurch St., London, E. C.*